United States Patent [19]

Krenzer

[11] 3,818,024
[45] June 18, 1974

[54] BENZOTHIAZOL SUBSTITUTED THIADIAZOLIDINES

[75] Inventor: John Krenzer, Oak Park, Ill.

[73] Assignee: Velsicol Chemical Corporation, Chicago, Ill.

[22] Filed: Feb. 16, 1972

[21] Appl. No.: 226,962

[52] U.S. Cl. .............................................. 260/305
[51] Int. Cl............................................ C07d 99/06
[58] Field of Search .................................... 260/305

[56] References Cited
UNITED STATES PATENTS

| | | | |
|---|---|---|---|
| 3,299,085 | 1/1967 | Schafer et al. ...................... | 260/305 |
| 3,558,661 | 1/1971 | Zumach et al. ...................... | 260/305 |
| 3,714,177 | 1/1973 | Engglhart ........................... | 260/305 |

*Primary Examiner*—Richard J. Gallagher
*Attorney, Agent, or Firm*—Robert J. Schwarz; Dietmar H. Olesch

[57] ABSTRACT

This invention discloses new compounds of the formula

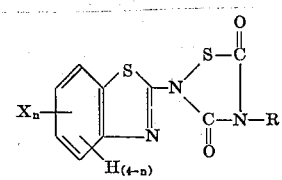

wherein X is selected from the group consisting of alkyl, halogen, and alkoxy; $n$ is an integer from 0 to 4 and R is alkyl. Further disclosed are herbicidal compositions utilizing as an essential active ingredient a compound of the above description.

6 Claims, No Drawings

BENZOTHIAZOL SUBSTITUTED THIADIAZOLIDINES

This invention relates to new chemical compositions and more particularly relates to new compounds of the formula

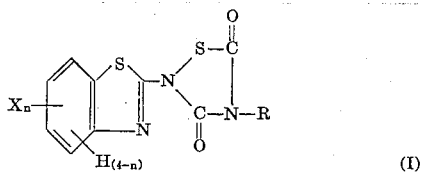

(I)

wherein X is selected from the group consisting of alkyl, halogen and alkoxy; n is an integer from 0 to 4; and R is alkyl.

The compounds of the present invention are unexpectedly useful as herbicides.

In a preferred embodiment of this invention X is selected from the group consisting of lower alkyl, chlorine, bromine and lower alkoxy; n is an integer from 0 to 2; and R is lower alkyl.

The term lower as used herein designates a straight or branched carbon chain of up to about six carbon atoms.

In a most preferred embodiment the X substituent is in the four and/or five position of the benzothiazole ring.

The compounds of the present invention can be readily prepared from a benzothiazole substituted urea of the formula

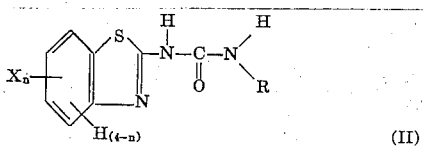

(II)

wherein X, n and R are as heretofore described, by reaction with chlorothioformyl chloride. This reaction can be effected by adding the chlorothioformyl chloride to the urea of Formula II contained in a suitable reaction medium such as toluene. The resulting mixture is then heated at the reflux temperature of the reaction mixture for a period of from 2 to about 12 hours. After this time the reaction mixture can be filtered to remove unreacted starting material. The desired product can then be recovered from the filtrate by evaporation of the solvent or by precipitation upon the addition of a nonsolvent such as pentane. The desired product can then be used as such or can be further purified by recrystallization or other standard techniques well known in the art.

The benzothiazole substituted ureas of Formula II are known in the art and their preparation is described in Belgian Pat. No. 765,477. These compounds can be prepared from an amino substituted benzothiazole of the formula

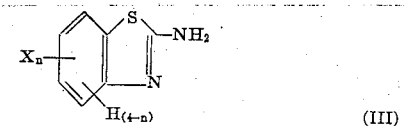

(III)

wherein X and n are as heretofore described, by reaction with an isocyanate of the formula

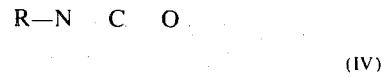

(IV)

wherein R is as heretofore described. This reaction can be effected by combining the benzothiazole of Formula III with the isocyanate of Formula IV in a suitable inert organic reaction medium such as ethyl ether. The reaction mixture can then be stirred at room temperature for a period sufficient to complete the reaction. Suitable reaction times can range from a period of about ½ to about 12 hours. The desired product can then be recovered by filtration if it forms as a precipitate or upon evaporation of the solvent and can be used as such or further purified by standard techniques.

The preparation of the compounds of the present invention is further illustrated in the following Examples.

EXAMPLE 1

Preparation of N-(1,3-Benzothiazol-2-yl)-N'-methylurea

2-Amino-1,3-benzothiazole (15 grams), methyl isocyanate (8 ml) and ethyl ether (300 ml) were charged into a glass reaction vessel equipped with a mechanical stirrer. The reaction mixture was stirred at room temperature for a period of about 6 hours resulting in the formation of a precipitate. The precipitate was recovered by filtration to yield the desired product N-(1,3-benzothiazol-2-yl)-N'-methylurea.

EXAMPLE 2

Preparation of 2-(1,3-Benzothiazol-2-yl)-4-methyl-1,2,4-thiadiazolidine-3,5-dione N-(1,3-Benzothiazol-2-yl)-N'-methylurea (10 g) and toluene (100 ml) were charged into a glass reaction vessel equipped with a mechanical stirrer, thermometer and reflux condenser. The mixture was heated at reflux and chlorothioformyl chloride (4.2 ml) was added thereto. Refluxing was continued for a period of about 3 hours. After this time the reaction mixture was filtered to remove unreacted starting material. Pentane was then added to the filtrate resulting in the formation of a precipitate. The precipitate was recovered by filtration and was recrystallized from methanol to yield the desired product 2-(1,3-benzothiazol-2-yl)-4-methyl-1,2,4-thiadiazolidine-3,5-dione having a melting point of 164°–166°C.

EXAMPLE 3

Preparation of N-(7-Methyl-1,3-benzothiazol-2-yl)-N'-methylurea

2-Amino-7-methyl-1,3-benzothiazole (17 grams) methyl isocyanate (8 ml) and ethyl ether (300 ml) are charged into a glass reaction vessel equipped with a mechanical stirrer. The reaction mixture is stirred at room temperature for a period of about 5 hours to form a precipitate. The precipitate is recovered by filtration to yield the desired N-(7-methyl-1,3-benzothiazol-2-yl)-N'-methylurea.

EXAMPLE 4

Preparation of 2-(7-Methyl-1,3-benzothiazol-2-yl)-4-methyl-1,2,4-thiadiazolidine-3,5-dione N-(7-Methyl-1,3-benzothiazol-2-yl)-N'-methylurea (11 grams) and toluene (200 ml) are charged into a glass reaction vessel equipped with a mechanical stirrer, thermometer and reflux condenser. The mixture is heated to reflux and chlorothioformyl chloride (4.2 ml) is added thereto. Refluxing is continued for a period of about 3 hours. After this time the reaction mixture is filtered to remove unreacted starting material. Pentane is then added to the filtrate resulting in the formation of a precipitate. The precipitate is recovered by filtration and is recrystallized from methanol to yield the desired product 2-(7-methyl-1,3-benzothiazol-2-yl)-4-methyl-1,2,4-thiadiazolidine-3,5-dione.

Additional compounds within the scope of the present invention can be prepared by the procedures detailed in the foregoing examples. In the following examples are given the essential starting material for preparing the indicated named compounds by the methods heretofore described.

EXAMPLE 5

2-Amino-7-chloro-1,3-benzothiazole + methyl isocyanate + chlorothioformyl chloride = 2-(7-chloro-1,3-benzothiazol-2-yl)-4-methyl-1,2,4-thiadiazolidine-3,5-dione.

EXAMPLE 6

2-Amino-6-methoxy-1,3-benzothiazole + methyl isocyanate + chlorothioformyl chloride = 2-(6-methoxy-1,3-benzothiazol-2-yl)-4-methyl-1,2,4-thiadiazolidine-3,5-dione.

EXAMPLE 7

2-Amino-6-ethyl-7-bromo-1,3-benzothiazole + ethyl isocyanate + chlorothioformyl chloride = 2-(6-ethyl-7-bromo-1,3-benzothiazol-2-yl)-4-ethyl-1,2,4-thiadiazolidine-3,5-dione.

EXAMPLE 8

2-Amino-6-n-propoxy-1,3-benzothiazole + isopropyl isocyanate + chlorothioformyl chloride = 2-(6-n-propoxy-1,3-benzothiazol-2-yl)-4-isopropyl-1,2,4-thiadiazolidine-3,5-dione.

EXAMPLE 9

2-Amino-6-fluoro-7-n-butyl-1,3-benzothiazole + n-butyl isocyanate + chlorothioformyl chloride = 2-(6-fluoro-7-n-butyl-1,3-benzothiazol-2-yl)-4-n-butyl-1,2,4-thiadiazolidine-3,5-dione.

EXAMPLE 10

2-Amino-5-n-hexyl-6-iodo-1,3-benzothiazole + n-hexyl isocyanate + chlorothioformyl chloride = 2-(5-n-hexyl-6-iodo-1,3-benzothiazol-2-yl)-4-n-hexyl-1,2,4-thiadiazolidine-3,5-dione.

EXAMPLE 11

2-Amino-4-hexyloxy-1,3-benzothiazole + methyl isocyanate + chlorothioformyl chloride = 2-(4-hexyloxy-1,3-benzothiazol-2-yl)-4-methyl-1,2,4-thiadiazolidine-3,5-dione.

EXAMPLE 12

2-Amino-4-methyl-6,7-dichloro-1,3-benzothiazole + methyl isocyanate + chlorothioformyl chloride = 2-(4-methyl-6,7-dichloro-1,3-benzothiazol-2-yl)-4-methyl-1,2,4-thiadiazolidine-3,5-dione.

For practical use as herbicides the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

EXAMPLE 13

Preparation of a Dust

| | |
|---|---|
| Product of Example 2 | 10 |
| Powdered Talc | 90 |

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, dessicants, growth inhibitors, and the like in the herbicidal compositions heretofore described. These other materials can comprise from about 5 to about 95 percent of the active ingredients in the herbicidal compositions. Use of combinations of these other herbicides and/or defoliants, dessicants, etc., with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4-CPB, 4-CPA, 4-CPP, 2,4,5-TB, 2,4,5-TES, 3,4-DA, silvex and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate and the like; substituted urea herbicides such as norea, siduron, dichloral urea, chloroxuron, cycluron, fenuron, monuron, monuron TCA, diuron, linuron, monolinuron, neburon, buturon, trimeturon and the like; symmetrical triazine herbicides such as simazine, chlorazine, atraone, desmetryne, norazine, ipazine, prometryn, atrazine, trietazine, simetone, prometone, propazine, ametryne, and the like; chloroacetamide herbicides such as alpha-chloro-N,N-dimethylacetamide, CDEA, CDAA, alpha-chloro-N-isopropylacetamide, 2-chloro-N-isopropylacetanilide, 4-(chloroacetyl)morpholine, 1-(chloroacetyl)piperidine, and the like; chlorinated aliphatic acid herbicides such as TCA, dalapon, 2,3-dichloropropionic acid, 2,2,3-TPA and the like; chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid, 3-methoxy-2,6-dichlorophenylacetic acid, 2-methoxy-3,5,6-trichlorophenyl-acetic acid, 2,4-dichloro-3-nitrobenzoic acid and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, DSMA, MSMA, potassium azide, acrolein, benefin, bensulide, AMS, bromacil, 2-(3,4-dichlorophenyl)-4-methyl-1,2,4-oxadiazolidine-3,5-dione, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP–50144, H–176–1, H–732, M–2901, planavin, sodium tetraborate, calcium cyanamid, DEF, ethyl xanthogen disulfide, sindone, sindone B, propanil and the like.

Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, roundleaved mallow, bull thistle, hounds-tongue, moth mullein, and purple star thistle; or perennials such as white cockle, perennial rye-grass, quackgrass, Johnsongrass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail and winter-cress.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as post-emergence testing.

The herbicidal activity of the compounds of this invention was demonstrated by experiments carried out for the post-emergence control of a variety of weeds. In these experiments the compounds to be tested were formulated as aqueous emulsions and sprayed at the indicated dosage on the foliage of the weeds that have attained a prescribed size. After spraying the plants were placed in a greenhouse and watered daily or more frequently. Water was not applied to the foliage of the treated plants. The severity of the injury was determined 10 to 15 days after treatment and was rated on the scale of from 0 to 10 as follows: 0 = no injury, 1,2 = slight injury, 3,4 = moderate injury, 5,6 = moderately severe injury, 7,8,9 = severe injury, and 10 = death. The effectiveness of these compounds is demonstrated by the following data:

TABLE I

| Weed Species | Injury Rating |
|---|---|
| Barnyard Grass | 8 |
| Crabgrass | 9 |
| Downy Brome | 6 |
| Foxtail | 9 |
| Johnson Grass | 9 |
| Wild Oats | 7 |
| Coffee Weed | 10 |
| Curly Dock | 10 |
| Bindweed | 8 |
| Matricaria | 5 |
| Velvet Leaf | 9 |
| Wild Mustard | 10 |

I claim:
1. A compound of the formula

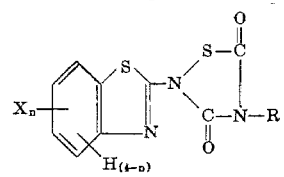

wherein X is selected from the group consisting of lower alkyl, halogen, and lower alkoxy; $n$ is an integer from 0 to 4; and R is lower alkyl.

2. The compound of claim 1, 2-(1,3-benzothiazol-2-yl)-4-methyl-1,2,4-thiadiazolidine-3,5-dione.

3. The compound of claim 1, 2-(7-methyl-1,3-benzothiazol-2-yl)-4-methyl-1,2,4-thiadiazolidine-3,5-dione.

4. The compound of claim 1, 2-(7-chloro-1,3-benzothiazol-2-yl)-4-methyl-1,2,4-thiadiazolidine-3,5-dione.

5. The compound of claim 1, 2-(6-methoxy-1,3-benzothiazol-2-yl)-4-methyl-1,2,4-thiadiazolidine-3,5-dione.

6. The compound of claim 1, 2-(6-ethyl-7-bromo-1,3-benzothiazol-2-yl)-4-ethyl-1,2,4-thiadiazolidine-3,5-dione.

* * * * *

UNITED STATES PATENT OFFICE
CERTIFICATE OF CORRECTION

Patent No. 3,818,024          Dated June 18, 1974

Inventor(s) John Krenzer

It is certified that error appears in the above-identified patent and that said Letters Patent are hereby corrected as shown below:

In column 2, line 4, Formula IV appearing as $$R - N \quad C \quad O$$

should read as follows:

$$R - N = C = O$$

Signed and sealed this 17th day of September 1974.

(SEAL)
Attest:

McCOY M. GIBSON JR.
Attesting Officer

C. MARSHALL DANN
Commissioner of Patents